United States Patent
Martinez et al.

(10) Patent No.: US 7,014,005 B2
(45) Date of Patent: Mar. 21, 2006

(54) SEAT BELT LATCH SENSOR ASSEMBLY

(75) Inventors: Daniel A. Martinez, El Paso, TX (US); Jose L Almaraz, Chihuahua (MX); Mario A. Recio, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 302 days.

(21) Appl. No.: 10/438,519

(22) Filed: May 15, 2003

(65) Prior Publication Data

US 2004/0226767 A1   Nov. 18, 2004

(51) Int. Cl.
    *B60R 22/48*   (2006.01)
(52) U.S. Cl. .................. 180/268; 73/862.393
(58) Field of Classification Search ............... 280/268, 280/735, 801.1; 73/862.391, 862.392, 862.393, 73/862.69; 24/641, 633; 180/268
    See application file for complete search history.

(56) References Cited

U.S. PATENT DOCUMENTS

| | | | |
|---|---|---|---|
| 5,752,299 A | 5/1998 | Vivacqua et al. | 24/633 |
| 5,898,366 A | 4/1999 | Brown et al. | 340/457.1 |
| 5,966,784 A | 10/1999 | Arbogast et al. | 24/633 |
| 6,175,304 B1 | 1/2001 | Becker | 340/457.1 |
| 6,329,893 B1 | 12/2001 | Furukawa et al. | 335/205 |
| 6,340,176 B1 | 1/2002 | Webber et al. | |
| 6,438,810 B1 | 8/2002 | Rogers, Jr. et al. | 24/641 |
| 6,474,435 B1 * | 11/2002 | Devereaux | 180/270 |
| 6,502,860 B1 | 1/2003 | Siegfried et al. | 280/801.1 |
| 6,554,318 B1 | 4/2003 | Kohut et al. | 280/801.1 |
| 6,572,147 B1 | 6/2003 | Webber et al. | |
| 6,640,648 B1 * | 11/2003 | Chamings et al. | 73/826 |
| 6,679,524 B1 * | 1/2004 | Greib et al. | 280/801.1 |
| 6,725,509 B1 | 4/2004 | Lee et al. | 24/641 |
| 6,729,194 B1 * | 5/2004 | Kaijala et al. | 73/862.69 |
| 6,729,427 B1 | 5/2004 | Do | 180/268 |
| 6,829,952 B1 * | 12/2004 | Stanley et al. | 73/862.391 |
| 6,851,503 B1 * | 2/2005 | Almaraz et al. | 180/268 |
| 2003/0213288 A1 | 11/2003 | Mireles et al. | 73/61.43 |
| 2003/0226409 A1 * | 12/2003 | Steele et al. | 73/862.391 |
| 2004/0060761 A1 | 4/2004 | Almarez et al. | 180/268 |

FOREIGN PATENT DOCUMENTS

WO    WO 02/06092    1/2002

* cited by examiner

*Primary Examiner*—David R. Dunn
(74) *Attorney, Agent, or Firm*—Jimmy L. Funke

(57) ABSTRACT

A seat belt tension sensor assembly includes a housing and a slider slidably received within the housing, the slider is configured for movement between a first position and a second position within the housing. A first and second magnets is associated with the slider for slidable movement therewith. The first and second magnetss are positioned side by side with opposite polarization while first and second hall effect devices are fixed relative to the housing. The first hall effect device protrudes between the first and second magnetss when the slider is in the second position, the first hall effect device being configured to produce an output signal indicative of a seat belt tension of a seat belt as applied to the sensor assembly. The second hall effect device is fixed relative to the housing and aligned with at least one of the first and second magnetss when the slider is in the second position. The second hall effect device is configured to generate a second output signal indicative of a latch condition of the seat belt as applied to the sensor assembly.

20 Claims, 6 Drawing Sheets

SEAT BELT LATCH SENSOR ASSEMBLY

TECHNICAL FIELD

The present invention relates to sensing tension between any two moving components. More particularly, this description applies to a seat belt tension sensor assembly that can detect the tension and engagement of a seat belt and provide an electrical signal in response thereto in relation to a safety restraint system.

BACKGROUND

Vehicles are provided with seat restraints systems such as seat belts in order to restrain occupants in the seat. The proper engagement and operation of the seat belt ensures the safety of a driver and his or her occupants.

Seat belts often incorporate sensors that provide data to other vehicle restraint vehicle systems such as airbags. Deployment of an airbag may partially depend on the information supplied by the sensor in the seat belt, such as a sensor may determine the weight of an object in the seat.

A tension sensor with the ability of sensing the tension in the belt system can be used to more accurately differentiate the size of the vehicle occupant. Additionally, a tension sensor can also be used to indicate that the seat belt is properly tightened and properly engaged or latched.

International Publication No. WO 02/06092 A1 discloses a seat belt tension sensor assembly, which includes a housing, a pair of magnets, and a Hall effect device all arranged to be coupled to an "anchor side" of a seat belt system (not the "buckle" side). The arrangement of the magnets relative to the sensor is not as integrated into the overall seat belt assembly as desired. In addition, the pair of magnets are oriented face to face wherein the direction of magnetization is in the same axis for both magnets, not in an opposite orientation. It is believed that this arrangement limits the useful tension resolving capabilities of the device.

Moreover, prior art latch detection systems that indicate positive seat belt buckle engagement consists of a mechanical switch subject to wear by mechanical contact of the switch pieces, thus representing a potential failure for indicating positive engagement of the seat belt buckle assembly.

Accordingly, there is a need for a seat belt tension sensor assembly that minimizes or eliminates one or more of the problems set forth above.

SUMMARY OF INVENTION

It is an object of the present invention to minimize or eliminate one or more of the problems set forth in the Background. One advantage of the present invention is that it allows a higher level of integration of the tension sensor assembly into the seat belt system. Several configurations between magnets and hall sensors can be arranged, depending on the objective of the sensing system. One exemplary embodiment described herein relates to a detection system in relation to a seat belt assembly, and more particularly to a seat belt tension sensor assembly. According to the invention, a seat belt tension sensor assembly includes a housing and a slider slidably received within the housing, the slider is configured for movement between a first position and a second position within the housing. A first and second magnets is associated with the slider for slidable movement therewith. The first and second magnets are positioned side by side with opposite polarization while first and second Hall effect devices are fixed relative to the housing. The first Hall effect device protrudes between the first and second magnets when the slider is in the second position, the first Hall effect device being configured to produce an output signal indicative of a seat belt tension of a seat belt as applied to the sensor assembly. The second Hall effect device is fixed relative to the housing and aligned with at least one of the first and second magnets when the slider is in the second position. The second Hall effect device is configured to generate a second output signal indicative of a latch condition of the seat belt as applied to the sensor assembly. In addition, the opposite orientation of the pair of magnets increases the magnetic field intensity thereby improving detection, and the accompanying signal-to-noise ratio. Moreover, the arrangement allows better use of the travel distance of the slider (i.e., the useful range over which tension sensing can occur).

The above-described and other features and advantages of the present invention will be appreciated and understood by those skilled in the art from the following detailed description, drawings, and appended claims.

BRIEF DESCRIPTION OF THE DRAWINGS

The present invention will now be described by way of example, with reference to the accompanying drawings, in which.

DETAILED DESCRIPTION OF THE PREFERRED EMBODIMENTS

Figure 1:
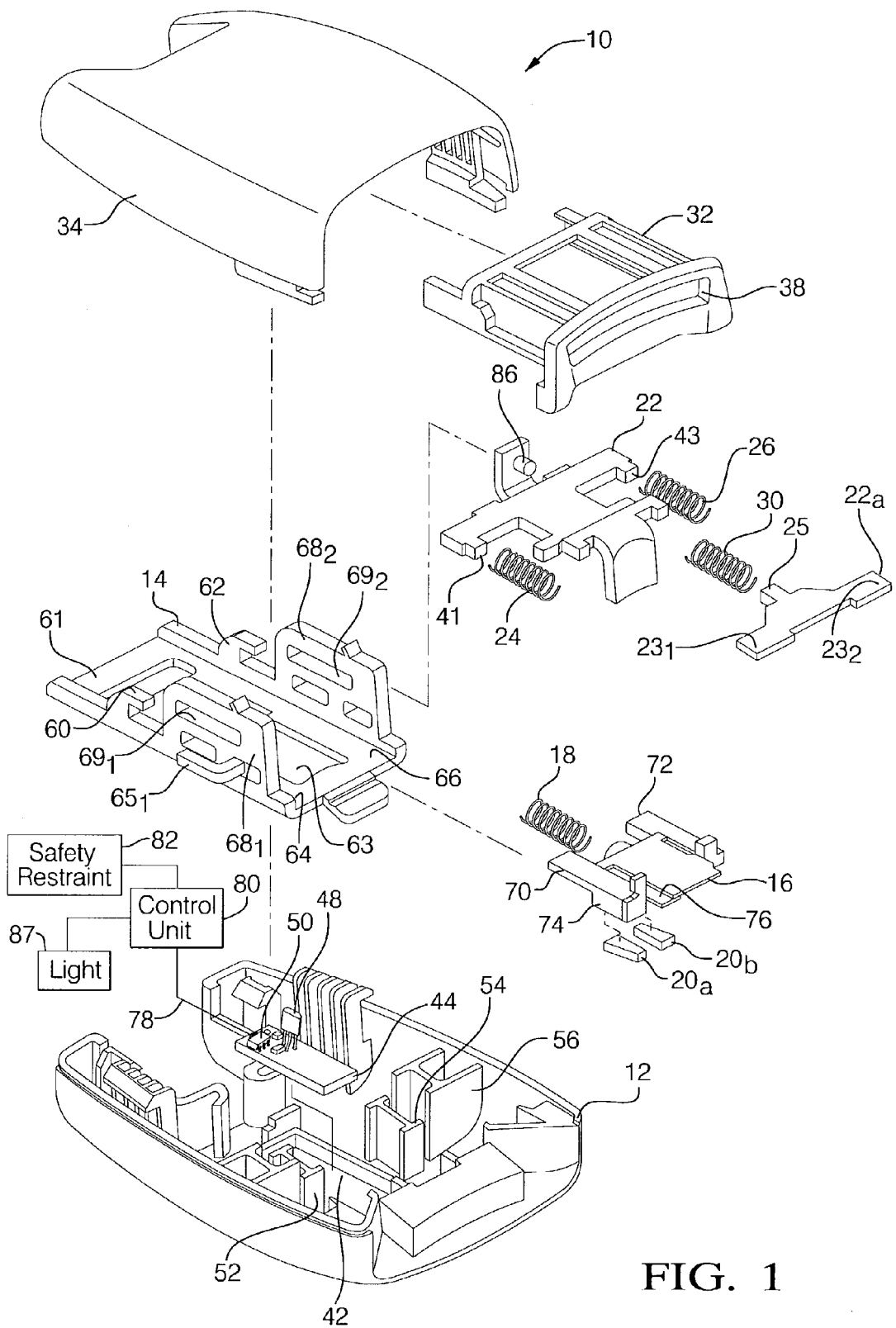
FIG. 1 is an assembly view of the seat belt tension sensor assembly used in accordance with one option of the present invention.

Referring now to the drawings wherein like reference numerals are used to identify identical components, FIG. 1 is an assembly view of the seat belt tension sensor assembly generally indicated by 10. The seat belt tension sensor assembly 10 includes a bottom cover 12, a buckle frame 14, a slider 16, spring 18, a pair of magnets 20a and 20b, hook portions 22 and 22a, biasing members 24 and 26, a spring 30, a release button 32 and an upper cover 34.

Bottom cover 12 and upper cover 34 form a housing 40, which may be constructed out of a lightweight, easily molded material such as plastic. Bottom cover 12 includes cavity 42 configured in size and shape to receive a printed circuit board (PCB) 44. PCB 44 may be mounted in cavity 42, for example, as shown. Printed circuit board 44 includes a Hall effect device 48 or other sensor capable of detecting a magnetic field. In an exemplary embodiment, device 48 is a programmable linear Hall effect device. Device 48 is arranged so that it protrudes generally in a normal direction outwardly from PCB 44. PCB 44 also includes a second sensor, such as a Hall effect switch 50, configured to detect when a seat belt is engaged, as described in greater detail below. As illustrated, bottom cover 12 also includes I-beam like structures 52, 54, and 56 that retain buckle frame 14 when slider 16, hook 22, 22a, spring 18 and biasing members 24 and 26 are assembled to buckle frame 14.

Figure 2:
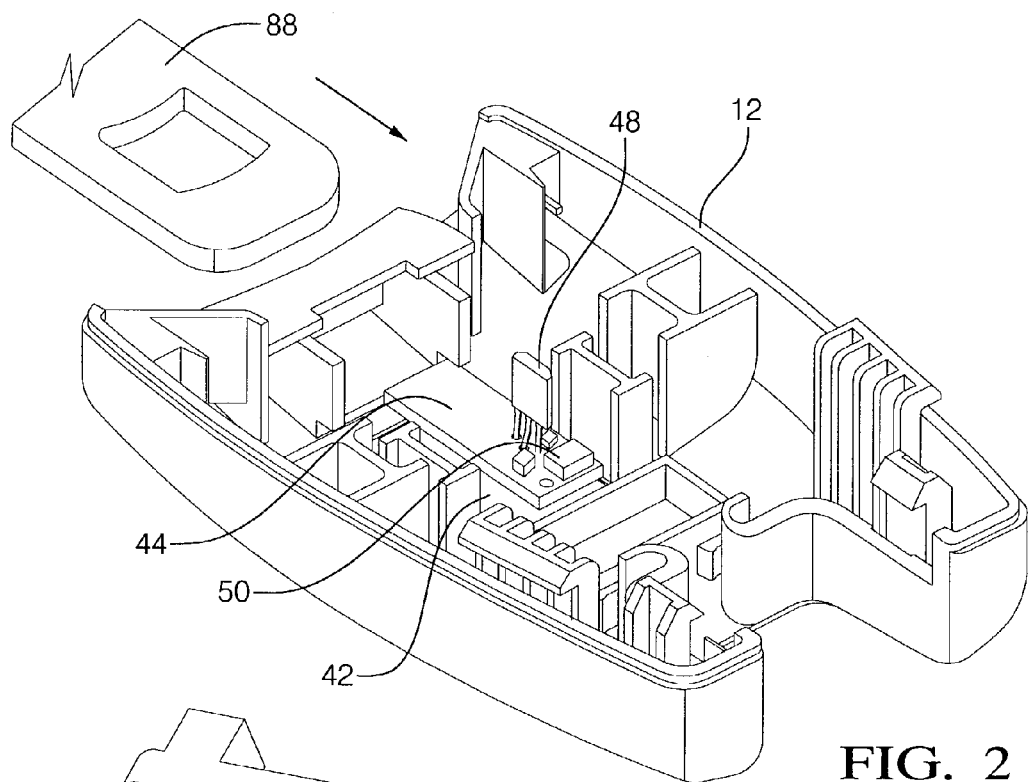
FIG. 2 is a simplified, perspective view of the seat belt sensor bottom cover in accordance with one option the present invention.

With reference to FIG. 2, a simplified, perspective view of the bottom cover 12 is provided. Bottom cover 12 includes cavity 42 whereby PCB 44 is housed. PCB 44 is standard type that allows electrical components to be surface mounted. Hall effect device 48 is mounted with three connections corresponding to power, ground and signal. Additionally, Hall effect switch or sensor 50 is used to detect a positive latch condition. A tongue 88 is shown in the unlatched position. It should be understood that the orientation of PCB 44 as shown in FIG. 2 is exemplary only and not limiting in nature. Many other orientations with respect to the placement of PCB 44 in the bottom cover 12 are achievable and are known to those of ordinary skill in the art and are consistent with the teachings of the present invention, which relate principally to the inventive arrangement. Nonetheless, the following may be taken as a non-limiting illustrated embodiment.

Referring again to FIG. 1, buckle frame 14 is generally rectangular shaped adapted to fit inside housing 40 and includes a generally planar base 61. Buckle frame 14 provides the means for receiving the assembly of slider 16 and hook portions 22, 22a. Buckle frame 14, as shown, also includes a pair of J-shaped extensions 60, 62. Buckle 14 also includes a centrally disposed opening 63 defined in part by a pair of opposing ledges 64 and 66. Opening 63 has a preselected lateral width, whose function will be described in greater detail below. Buckle frame 14 further includes a pair of side rails $68_1$ and $68_2$ extending generally normally from base 61, and having a preselected lateral width between inner surfaces thereof. Buckle frame 14 further includes elongated slots $69_1$ and $69_2$, which are formed in either side of side rails $68_1$ and $68_2$. The elongated slots $69_1$ and $69_2$ function to retain hook 22a, which provides support for release button 32. When release button 32, in latched condition, is pushed, button 32 pushes hook 22a and allows hook 22a to spin up releasing tongue 88 (FIG. 2).

FIG. 1 shows slider 16 from the top. Slider 16 is provided to carry a magnetic array responsive to engagement with and partial and full insertion of a seat belt tongue or latch 88 (best shown in FIG. 2). Slider 16 includes a pair of tabs 70 and 72. Slider 16 further includes cavities 74, 76 (best shown in FIG. 3), which are configured to receive magnets 20a and 20b, respectively, that define the magnetic array described above. The lateral (side-to-side) width of the cavities 74, 76 is selected to be no greater than the predetermined width of opening 63. This allows the cavities to be placed "down" into opening 63 of buckle 14 during assembly. Tabs 70, 72 have a side-to-side lateral width that is no greater than the preselected width between the side rails $68_1$, $68_2$. Through the foregoing, tabs 70, 72 can slide on top of ledges 64, 66.

Figure 3:
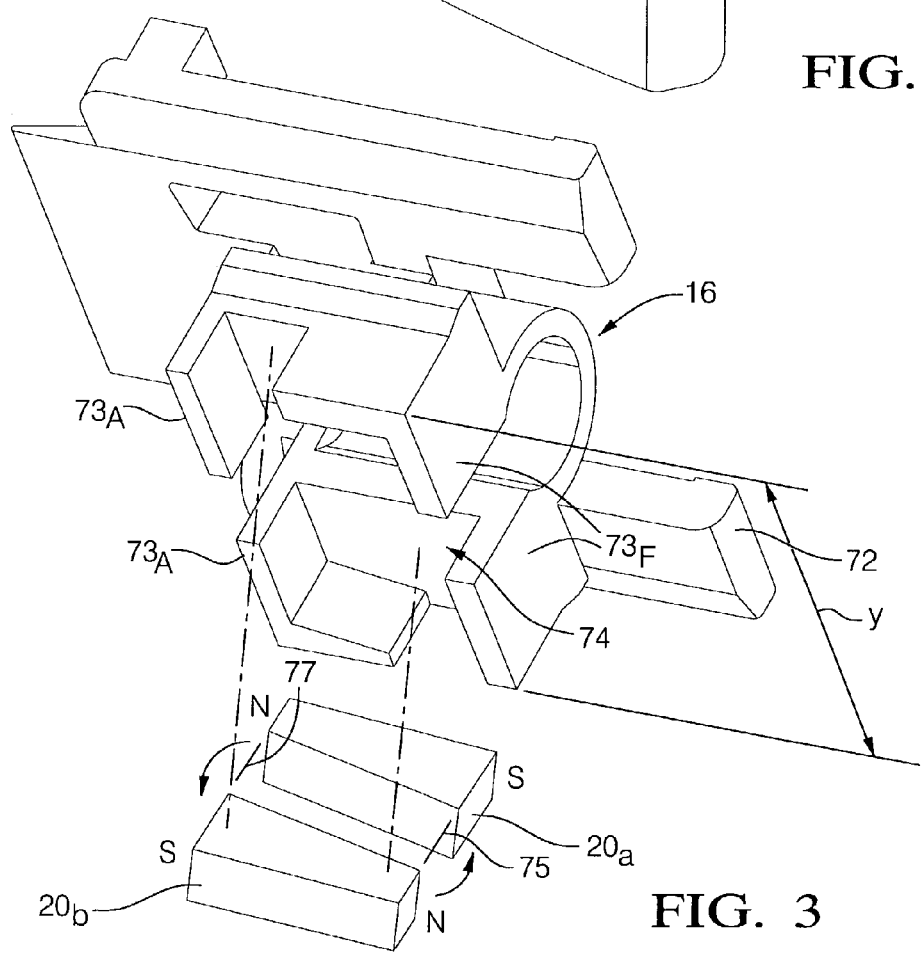
FIG. 3 is an exploded view of the slider and magnets in accordance with one option of the present invention.

FIG. 3 is an exploded, bottom view of slider 16 and its accommodation of magnets 20a and 20b. Slider 16 comprises two cavities 74 and 76 that house magnets 20a and 20b respectively. Distance-y-indicates the width of cavities 74 and 76 in order to fit through opening 63 of buckle frame 14. The forward and aft surfaces 73F and 73A respectively, of cavities 74, 76 cooperate with the forward and aft edges of opening 63 to provide mechanical stop features, thereby defining the longitudinal travel of slider 16. Magnets 20a and 20b are orientated side by side with opposite polarization (direction of magnetization on two parallel axis). In other words, magnets 20a and 20b are configured whereby the maximum magnetic field is created. This maximum magnetic field is desired in order to avoid, or reduce, the amount of field perturbations that can be caused by an external magnetic field or any other source that may perturb the magnetic flux lines.

The design of cavities 74 and 76 provide that magnets 20a and 20b are orientated in a special array whereby a higher magnetic field intensity is created relative to the known art. More specifically, magnets 20a and 20b are placed side by side wherein the north side of magnet 20a is facing the south side of magnet 20b. The array of magnets 20a and 20b provide the maximum positive field at 75 and the maximum negative field at axis 77. In addition, the opposite orientation of the pair of magnets increases the magnetic field intensity thereby improving detection, and the accompanying signal-to-noise ratio. Moreover, the arrangement allows better use of the travel distance of the slider (i.e., the useful range over which tension sensing can occur).

It should be understood that the orientation of magnets 20a and 20b as shown is exemplary only and not limiting in nature. Many other orientations with respect to the placement of magnets 20a and 20b relative to slider 16 are achievable and are known to those of ordinary skill in the art and are consistent with the teachings of the present invention, which relate principally to the inventive arrangement. Nonetheless, the following may be taken as a non-limiting illustrated embodiment.

The location of magnets 20a and 20b when assembled allow the Hall effect device 48 to protrude between magnets when slider 16 moves from a first position (FIG. 4) where little or no tension is applied (since tongue 88 is unlatched) in one of a plurality of second positions (FIGS. 5–8). The second position(s) may correspond to tension levels between zero (latched but no tension), to increasing levels of tension as the seat belt is cinched. During travel of slider 16, the Hall effect device 48 remains stationary in the bottom cover 12. The Hall effect device 48 will sense the strength of the magnetic field of the approaching magnets 20a and 20b as the magnets travel toward the Hall effect device 48. Corresponding to the strength of the magnetic field, the Hall effect device 48 will determine the measurement of the tension, and will produce a signal that will determine whether or not to suppress any safety-related items 82 such as a hyper-tensioner, airbag, or pre-tensioner, etc. When the tension force as detected by the present invention exceeds the pre-determined threshold, the system may be configured to suppress a passenger air bag.

In an exemplary embodiment, the Vcc of the Hall effect device 48 is 5 volts+/−0.5 volts DC. The voltage with no magnetic field present will be approximately 2.5v. As the magnets are brought into the proximity of the Hall effect device, the voltage will increase to near Vcc or decrease to near ground, depending on the polarity of the magnets. Accordingly, as the voltage increases or decreases, so does the proximity of magnets 20a and 20b relative to device 48 indicative of tension of the seat belt when the seat belt is in the latch condition. Of course, Vcc may have values greater than and less than 5 volts.

With continued reference to FIG. 1, slots 60 and 62 allow hook 22 to hinge and thereby allow movement of the hook 22 when a latch (not shown) of the seat belt is inserted into assembly 10. Biasing members 24 and 26 provide a biasing force and are held into place by a pair of tabs 41 and 43 of hook 22 and a pair of hooks $65_1$ and $65_2$ (not shown) located on either side of buckle frame 14. Biasing members 24 and 26 can be of either compression or tension type. Biasing members 24 and 26 provide the urging force that slider 16 must overcome in order to move from a first position to a second position (as described above).

In an exemplary embodiment, the biasing force of the members 24 and 26 is overcome when a force of about 5 to about 15 pounds is applied therefore causing slider 16 to move into the second position (FIGS. 5–8). Of course, and as such applications may require, the biasing force of members 24 and 26 to become overcome may vary. Accordingly, and when the urging force of members 24 and 26 are overcome, slider 16 travels towards the Hall effect device 48 and magnets 20a and 20b create a magnetic field around the Hall effect device 48 causing a resulting signal to be sent through a plurality of wires 78 and sent to the control unit 80.

FIG. 1 also shows hook 22a including wing like structures $23_1$ and $23_2$ which protrude out from elongated slots $69_1$ and $69_2$ (when assembled) and glide in a back and forth like manner when release button 32 is activated. Spring 30 is placed between hook 22a on tab 25 and stub 86 of hook 22, which allows movement of the release button 32.

Once release button 32 is in place, upper cover 34 snaps over bottom cover 12 and the integral seat belt sensor assembly is complete. Accordingly, the seat belt sensor assembly 10 is easily assembled.

Figure 4:
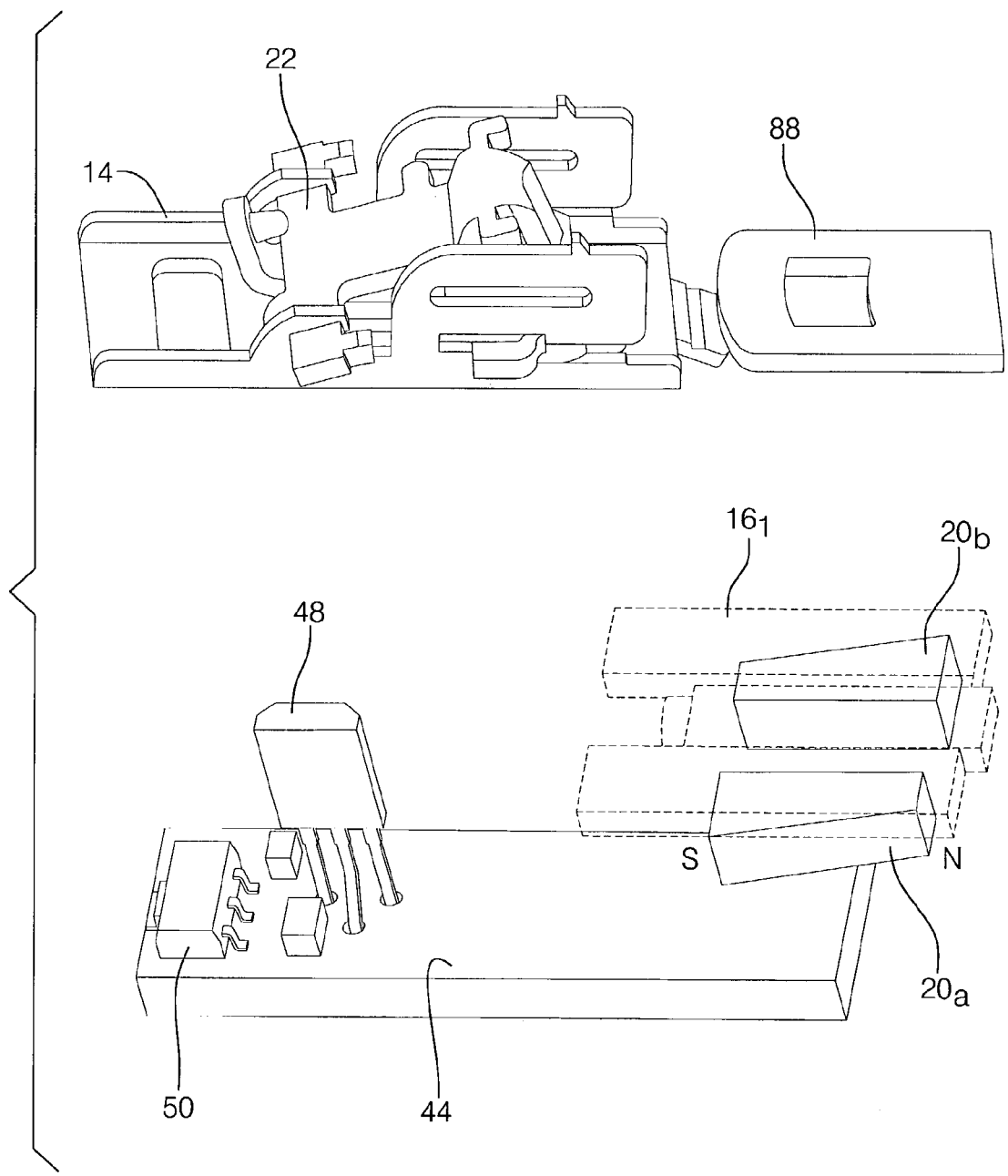
FIG. 4 is an exploded view of the seat belt sensor assembly in the unlatched position.

Referring now to FIG. 4, an exploded view of the seat belt sensor assembly 10 in an unlatched position is provided. When latch 88 is on the outside of sensor assembly, hook 22, hinged at buckle frame 14, is in the upright position as shown. The unlatched position allows slider $16_1$, accommodating magnets 20a and 20b, to be urged into the first position through spring 18. When the slider 16, is at the first position, magnets 20a and 20b are located away from Hall effect switch 50 of PCB 44. Switch 50 is capable of reading the magnet field created by magnets 20a and 20b or more accurately, sensing an absence of a magnetic field from distal magnets 20a and 20b and registers a signal corresponding to the position. This signal may provide information to control unit 80 warning driver to latch seat belt via light 87 (FIG. 1), for example, when the vehicle is in use.

Figure 5:
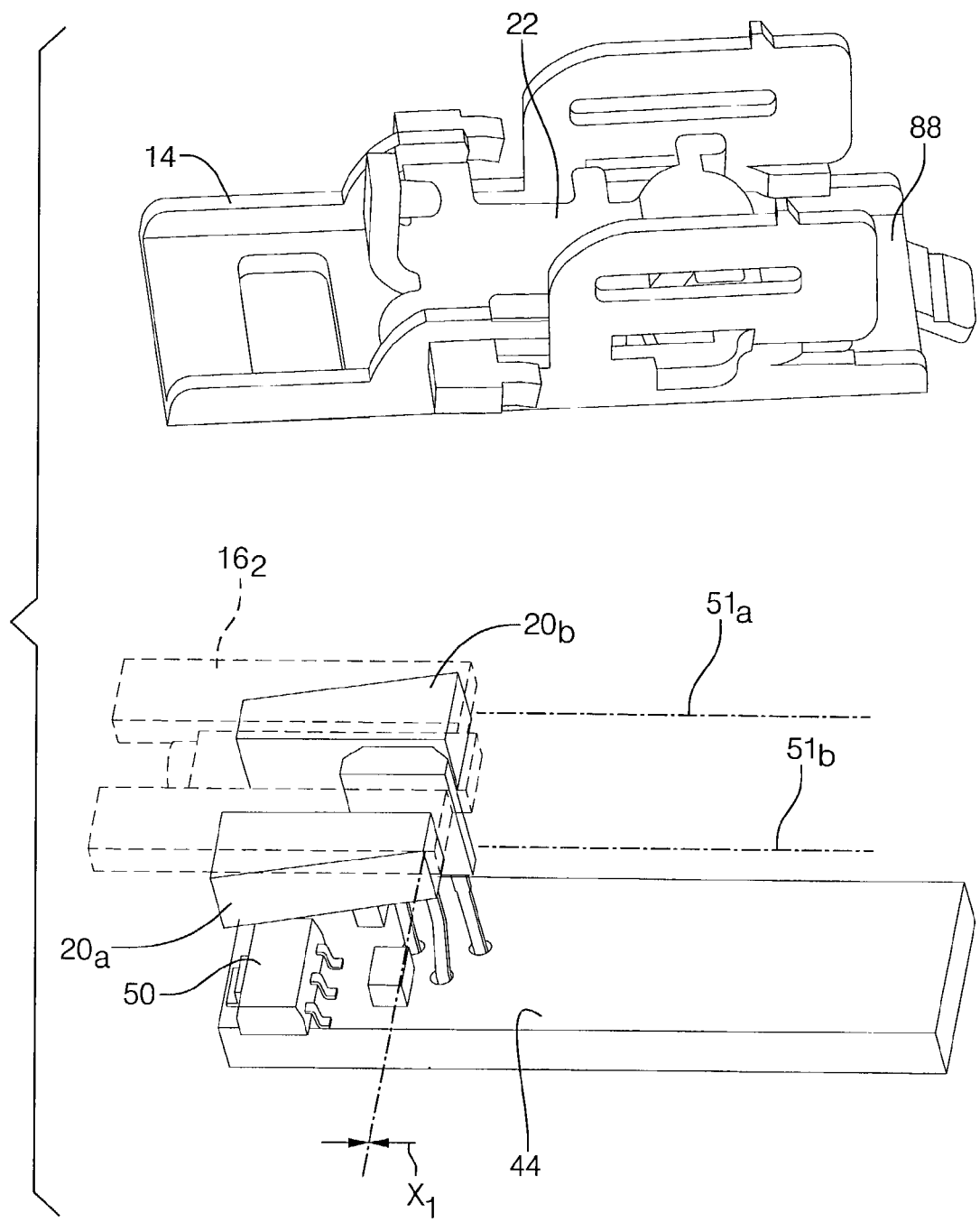
FIG. 5 is an exploded view of the seat belt sensor assembly in a first latched position with a first amount of tension applied, namely zero tension.
Figure 6:
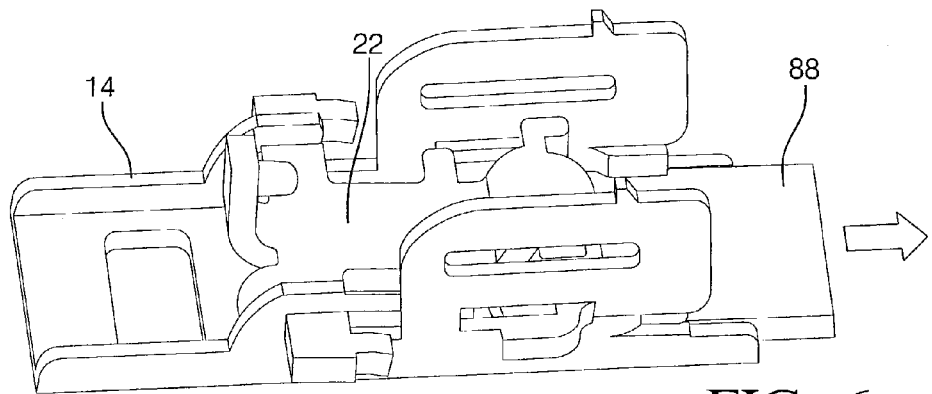
FIG. 6 is an exploded view of the seat belt sensor assembly in a second latched position with a second amount of tension applied.
Figure 7:
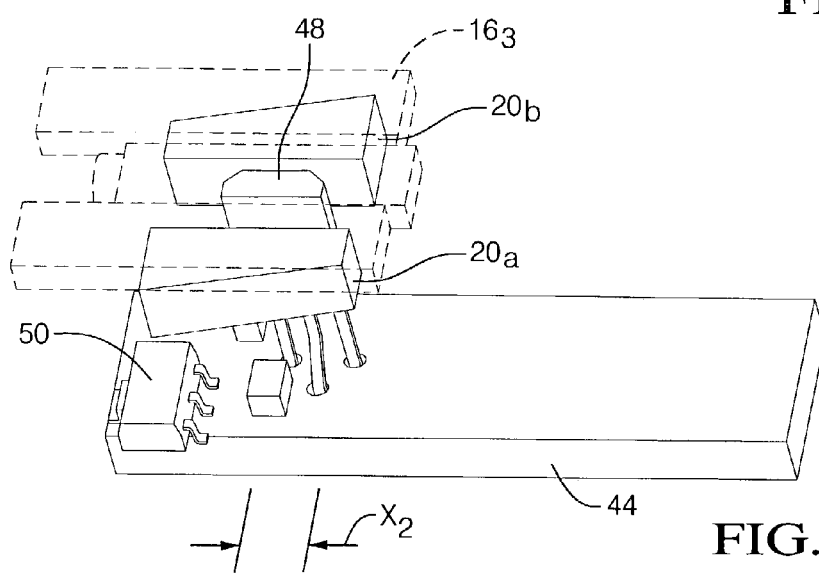
FIG. 7 is an exploded view showing a Hall effect device and magnets in a position corresponding to the second latched position of FIG. 8.
Figure 8:
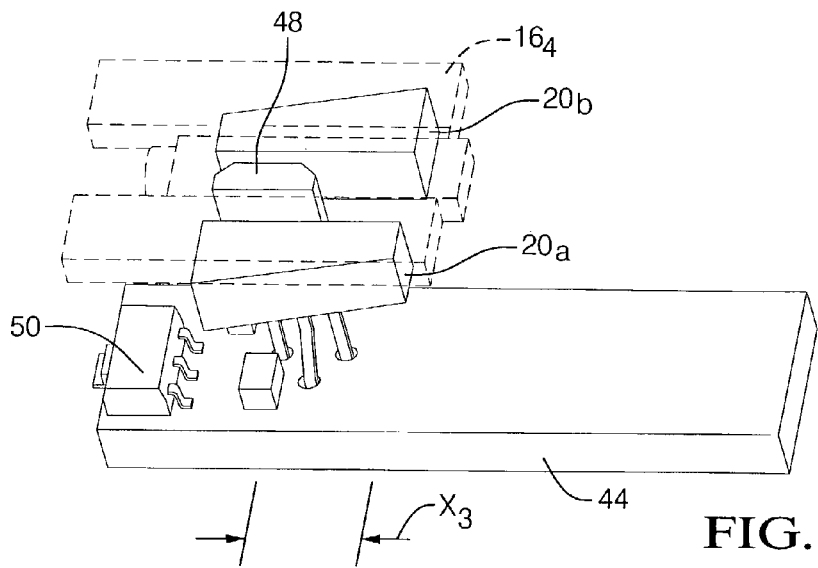
FIG. 8 is an exploded view showing the magnets in a position corresponding to a third latched position and with a third amount of tension applied.

FIG. 5 represents an exploded view of the seat belt sensor assembly 10 in the latched position, with zero tension. When latch 88 is inside sensor assembly 10, hook 22 hinged at buckle frame 14 is in the closed position as shown in the upper part of FIG. 5. The latched position causes slider at a second position $16_2$ specifically the magnets 20a and 20b thereof, to be substantially aligned with Hall effect device 48. Measurement $X_1$ is arbitrarily selected for purposes of illustration to place magnets 20a and 20b at a certain distance from the front edge of Hall effect device 48. This distance registers a certain magnetic field strength whereby Hall effect device 48 produces an output signal accordingly. Magnets 20a and 20b respectively travel along axes 51a and 51b. Axes 51a and 51b are offset one from another. The array of magnets 20a and 20b cooperate to provide a higher magnetic field intensity whereby the output signal is improved and the signal to noise ratio is improved. The magnetic array arrangement is also more efficient with respect to resolving varying tension levels inasmuch as it provides a higher percentage of effective use of travel compared to the total travel of the slider. This will be shown as FIGS. 6–8 are described, showing how changes in tension translate into an offset distance, which in turn changes the position of the Hall effect device 48 in the magnetic field created by magnets 20a and 20b. Resulting changes in the detected field strength by sensor 48 will vary the output signal (e.g., a voltage level).

Furthermore, when the slider is at the second position $16_2$, magnets 20a and 20b are located proximate switch 50 of PCB 44 and one magnet 20a is aligned with Hall effect switch 50. Switch 50 is capable of reading the magnet field created by magnets 20a and 20b to sense the presence of a magnetic field from magnets 20a and 20b, and register a signal corresponding to the position indicative of a positive latch condition. This signal may provide information to control unit 80 notifying the driver of positive latch engagement via light 87 (FIG. 1), for example, being turned off when the vehicle is in use. Switch 50 is preferably programmable to switch from "off" to "on" at a selected flux density value created by magnets 20a and 20b aligned therewith indicative of a latch condition. When switch 50 detects a latch condition or is switched "on", the linear Hall effect device 48 is programmed to begin detecting tension via magnets 20a and 20b. Switch 50 remains "on" as seat magnets 20a and 20b move away from and out of alignment with switch 50 as tension is increased until the reducing flux density reaches a value indicative of an un-latch condition, at which point switch 50 changes state from "on" to "off".

FIG. 6 shows tension is applied to the seat belt (not shown). Latch 88 moves in the direction of the arrow thereby creating a force necessary to move slider 16 from position $16_2$ toward position $16_3$.

FIG. 7 shows slider in position $16_3$. Distance $X_2$ places magnets 20a and 20b, residing in slider at position $16_3$, at a certain distance from the front edge of Hall effect device 48. This distance $X_2$ correspond to a certain tension applied via latch 88. The relative positions of Hall effect device 48 and magnets 20a, 20b register a certain magnetic field strength whereby Hall effect device 48 produces an output signal that corresponds to the intensity of the magnetic field created by the location of magnets 20a and 20b.

If additional tension is applied as illustrated in FIG. 8, distance $X_3$ places magnets 20a and 20b, residing in slider $16_4$ at a distance defined by $X_3$ from the front edge of Hall effect device 48.

Many tension levels can be created when latch 88 is pulled and tightened, therefore measurements of $X_2$ and $X_3$ illustrate but a few of the plurality of possible tension measurements that may occur when operating the seat belt sensor tension assembly.

The magnets traverse a distance with respect to the tension applied to slider 16. More specifically, if magnets 20a and 20b travel a total distance of 8 mm with slider 16, approximately 7 mm of data is captured by Hall effect device 48. Additionally, if magnets 20a and 20b travel 5 mm total with slider 16, approximately 4 mm of data is captured by Hall effect device 48. Therefore the distance of the travel as compared to the total travel of slider 16 is more effectively translated into useful information by Hall effect device 48.

Figure 9:
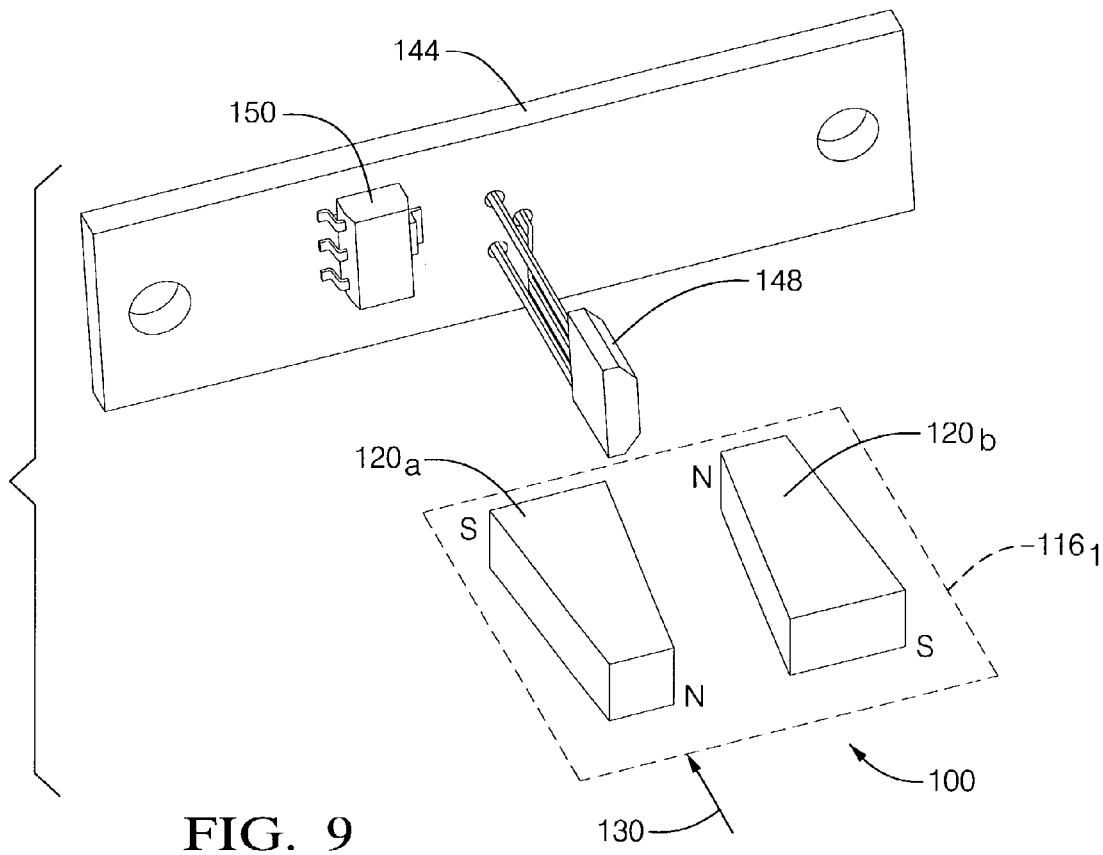
FIG. 9 is a perspective view of an alternative embodiment showing magnets oriented in a different position with respect to the Hall effect devices mounted to a PCB of the seat belt sensor assembly in the unlatched position.
Figure 10:
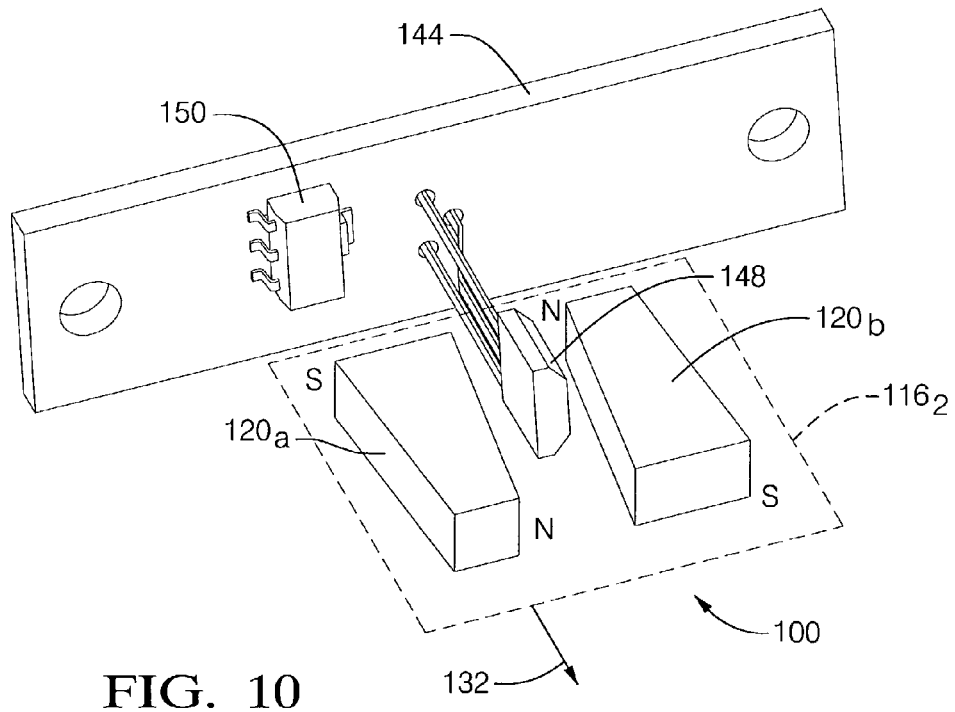
FIG. 10 is a perspective view of the alternative embodiment of FIG. 9 illustrating the magnets oriented with respect to the Hall effect devices in a latched position.

Referring now to FIGS. 9 and 10, an alternative embodiment of a seat belt sensor assembly 100 having a contactless latch detector integrated with a seat belt tension sensor is illustrated. FIG. 9 illustrates an unlatched condition while FIG. 10 illustrates a positive latch condition indicative of positive engagement between latch 88 (not shown) and a slider 116.

FIG. 9 illustrates the slider in a first position at $116_1$ in an unlatched position. Slider 116 translates toward PCB 144 illustrated with arrow 130. In this manner, slider 116 is normal to a surface defining PCB 144 having a Hall effect device 148 and a Hall effect switch 150 extending therefrom. As latch 88 is brought into positive engagement with slider 116, magnet 120a is proximate Hall effect switch 150 and aligned therewith, as illustrated in FIG. 10. In this second position at $116_2$, magnets 120a and 120b create a magnetic flux density to turn "on" Hall effect switch 150 indicative of a positive latch condition. In this state, device 148 can begin sensing tension applied and magnets 120a and 120b move in a direction indicated by arrow 132 when tension is applied.

When slider 116 is at the second position 1162, magnets 120a and 120b are located proximate switch 150 of PCB 144 and one magnet 120a is aligned with switch 150. Switch 150 is capable of reading the magnet field created by magnets 120a and 120b to sense the presence of a magnetic field from magnets 120a, 120b and register a signal corresponding to the position indicative of a positive latch condition. This signal may provide information to control unit 80 notifying the driver of positive latch engagement via light 87 (FIG. 1), for example, being turned off when the vehicle is in use. Switch 150 is preferably programmable to switch from "off" to "on" at a selected flux density value created by magnets 120a and 120b aligned therewith indicative of a latch condition. When switch 150 detects a latch condition or is switched "on", the linear hall device 148 is programmed to begin detecting tension via magnets 120a and 120b. Switch 150 remains "on" as magnets 120a and 120b move away from and out of alignment with switch 150 as tension is increased until the reducing flux density reaches a value indicative of an unlatch condition, at which point switch 150 changes state from "on" to "off".

FIG. 10 shows tension applied to the seat belt (not shown). Latch 88 moves in the direction of arrow 132 thereby creating a force necessary to move slider 116 away from position $116_1$ toward position $116_2$.

By eliminating a mechanical contact switch to indicate a positive latch condition that is subject to wear resulting in failure, and using a seat belt sensor magnet in conjunction with a Hall effect switch to detect latch engagement, a potential failure mode is eliminated and less parts are employed. In addition, use of the Hall effect switch to indicate positive latch engagement may also be employed to initiate seat belt tension sensing. It will also be noted that the figures used herein illustrate only two possible configurations that will yield the sensing system being included in this invention. The position of the hall devices and PCB relative to each other and to other components of the buckle assembly may be changed. An example of such diversity can be observed (but is not limited to) by comparing FIGS. 9 and 10 to FIG. 1.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A buckle and sensor assembly for a seat belt having a tongue, comprising:
    a housing configured to receive the tongue therein;
    a slider slidably received within said housing, said slider being configured for movement between a first position and a second position within said housing, said slider being moved toward said second position when at least a portion of the tongue is inserted into said housing;
    first and second magnets coupled to said slider for slidable movement therewith, said first magnet having first and second ends, said second magnet having third and fourth ends proximate the first and second ends, respectively, of the first magnet, said first and second ends having opposite magnetic polarization from one another, said second and fourth ends having opposite magnetic polarization from one another;
    a first Hall effect device being disposed at a first fixed location within said housing, said first and second magnets being moved proximate to said first Hall effect device when said slider is moved toward said second position, said first Hall effect device outputting a first output signal when said slider is disposed proximate to said second position and said tongue is engaged to said housing indicating a seat belt tension applied to said tongue; and
    a second Hall effect device being disposed at a second fixed location within said housing and aligned with at least one of said first and second magnets when said slider is moved toward said second position, said second Hall effect device outputting a second output signal when said slider is disposed at said second position indicating insertion of at least a portion of said tongue within said housing.

2. The buckle and sensor assembly of claim 1 further comprising:
    a biasing member for providing an urging force to said slider, said urging force urging said slider into said first position.

3. The buckle and sensor assembly of claim 1 wherein said housing further comprises a hook to accept said tongue.

4. The buckle and sensor assembly of claim 1 wherein said slider is adapted for receiving force from said tongue.

5. The buckle and sensor assembly of claim 1 wherein said first Hall effect device is a linear Hall effect device, said second Hall effect device has first and second operational states.

6. The buckle and sensor assembly of claim 1 wherein at least one of said first and second Hall effect devices are programmable.

7. The buckle and sensor assembly of claim 1 wherein said first output signal changes based on an amount of tension applied to said tongue.

8. The buckle and sensor assembly of claim 1, wherein said slider comprises first and second tab portions coupled together via an intermediate member, the intermediate member defining first and second cavities to receive said first and second magnets, respectively, therein.

9. The buckle and sensor assembly of claim 8, further comprising a buckle frame disposed in said housing configured to receive said slider thereon, said buckle frame having a first surface defining an aperture, said buckle frame being configured to allow said first and second tab portions of said slider to slide on said first surface.

10. The buckle and sensor assembly of claim 9, wherein said first and second magnets are disposed in said aperture of said buckle frame during slidable movement of said slider.

11. A buckle and sensor assembly for a seat belt having a tongue, comprising:
a housing configured to receive the tongue therein;
a slider slidably received within said housing, said slider being configured for movement between a first position and a second position within said housing, said slider being moved toward said second position when at least a portion of the tongue is inserted into said housing;
first and second magnets coupled to said slider for slidable movement therewith, said first magnet having first and second ends, said second magnet having third and fourth ends proximate the first and second ends, respectively, of the first magnet, said first and second ends having opposite magnetic polarization from one another, said second and fourth ends having opposite magnetic polarization from one another;
a first Hall effect device being disposed at a first fixed location within said housing, said first and second magnets being moved proximate to said first Hall effect device when said slider is moved toward said second position, said first Hall effect device outputting a first output signal when said slider is disposed proximate to said second position and said tongue is engaged to said housing indicating a seat belt tension applied to said tongue; and
a second Hall effect device being disposed at a second fixed location within said housing and aligned with at least one of said first and second magnets when said slider is moved toward said second position, said second Hall effect device outputting a second output signal when said slider is disposed at said second position indicating insertion of at least a portion of said tongue within said housing, said first and second output signals being received by a control unit.

12. The buckle and sensor assembly of claim 11 wherein said control unit is configured to control operation of a first device in response to said output signal.

13. The buckle and sensor assembly of claim 12 wherein said first device is an airbag.

14. The buckle and sensor assembly of claim 12 wherein said first device is a pre-tensioner.

15. The buckle and sensor assembly of claim 11 wherein said first Hall effect device is a linear Hall effect device, said second Hall effect device has first and second operational states.

16. The buckle and sensor assembly of claim 15 wherein at least one of said first and second Hall effect devices are programmable.

17. A method for determining engagement of a seat belt tongue within a buckle assembly and an amount of tension applied to the seat belt tongue, said buckle assembly having a housing configured to receive the tongue therein, said buckle assembly having a slider slidably received within said housing, said slider being configured for movement between a first position and a second position within said housing, said buckle assembly further having first and second magnets coupled to said slider for slidable movement therewith, said first magnet having first and second ends, said second magnet having third and fourth ends proximate the first and second ends, respectively, of the first magnet, said first and second ends having opposite magnetic polarization from one another, said second and fourth ends having opposite magnetic polarization from one another, said buckle assembly further having a first Hall effect device being disposed at a first fixed location within said housing, said buckle assembly further having a second Hall effect device being disposed at a second fixed location within said housing, the method comprising:
moving said slider from said first position toward said second position within said housing when at least said portion of said tongue is inserted into said housing to induce said first and second magnets to move with said slider toward said first and second Hall effect devices;
outputting a first output signal from said first Hall effect device when said slider is disposed proximate said second position and said first and second magnets are disposed proximate said first Hall effect device when said seat belt tongue is engaged to said housing, said first output signal indicating a seat belt tension applied to said seat belt tongue; and
outputting a second output signal from said second Hall effect device when said slider is disposed at said second position and said first and second magnets are disposed proximate to said second Hall effect device, said second output signal indicating insertion of at least a portion of said seat belt tongue within said housing.

18. The method of claim 17, further comprising controlling operation of a first device in response to said first output signal.

19. The method of claim 18, wherein said first device comprises an airbag.

20. The method of claim 18, wherein said first device comprises a pre-tensioner.

* * * * *